(12) United States Patent
Su

(10) Patent No.: US 8,253,289 B2
(45) Date of Patent: Aug. 28, 2012

(54) OVERLOAD PROTECTION DEVICE FOR MOTOR

(75) Inventor: Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 577 days.

(21) Appl. No.: 12/547,491

(22) Filed: Aug. 26, 2009

(65) Prior Publication Data

US 2010/0327682 A1 Dec. 30, 2010

(30) Foreign Application Priority Data

Jun. 29, 2009 (CN) .......................... 2009 1 0303814

(51) Int. Cl.
*H02K 7/108* (2006.01)

(52) U.S. Cl. ............................ 310/78; 310/83; 192/56.1

(58) Field of Classification Search ................... 310/78, 310/83, 92, 97, 99; 192/56.1, 56.5
See application file for complete search history.

(56) References Cited

U.S. PATENT DOCUMENTS

| | | | | |
|---|---|---|---|---|
| 715,918 | A * | 12/1902 | Wick | 192/56.5 |
| RE23,361 | E * | 4/1951 | Hall | 192/56.51 |
| 7,999,426 | B2 * | 8/2011 | Su | 310/78 |
| 2010/0252388 | A1 * | 10/2010 | Su | 192/56.41 |
| 2010/0320952 | A1 * | 12/2010 | Su | 318/475 |
| 2010/0327682 | A1 * | 12/2010 | Su | 310/78 |

* cited by examiner

*Primary Examiner* — Quyen Leung
*Assistant Examiner* — David Scheuermann
(74) *Attorney, Agent, or Firm* — Altis Law Group, Inc.

(57) ABSTRACT

An overload protection device using a rotatable arm rotatably connected to a driving wheel and a resilient member connecting the rotatable arm with the driving wheel for transmitting the torque outputted by a motor to the driving wheel, the resilient member is obviously deformed when the motor is operated in a overload condition to detach the rotatable arm from the motor for protecting the motor from the overload condition.

8 Claims, 2 Drawing Sheets

OVERLOAD PROTECTION DEVICE FOR MOTOR

BACKGROUND

1. Technical Field

The present disclosure relates to overload protection devices and, particularly, to an overload protection device for a motor.

2. Description of Related Art

Generally, a circuit for driving an electric motor usually employs a fuse. The fuse breaks when the electric motor overloads to protect the electric motor from damages. However, after each time the fuse breaks, to restore the circuit, the fuse needs to be replaced. This is an inconvenient and very time-consuming.

Therefore, it is desirable to provide an overload protection device which can overcome the above-mentioned problems.

DETAILED DESCRIPTION

Figure 1:
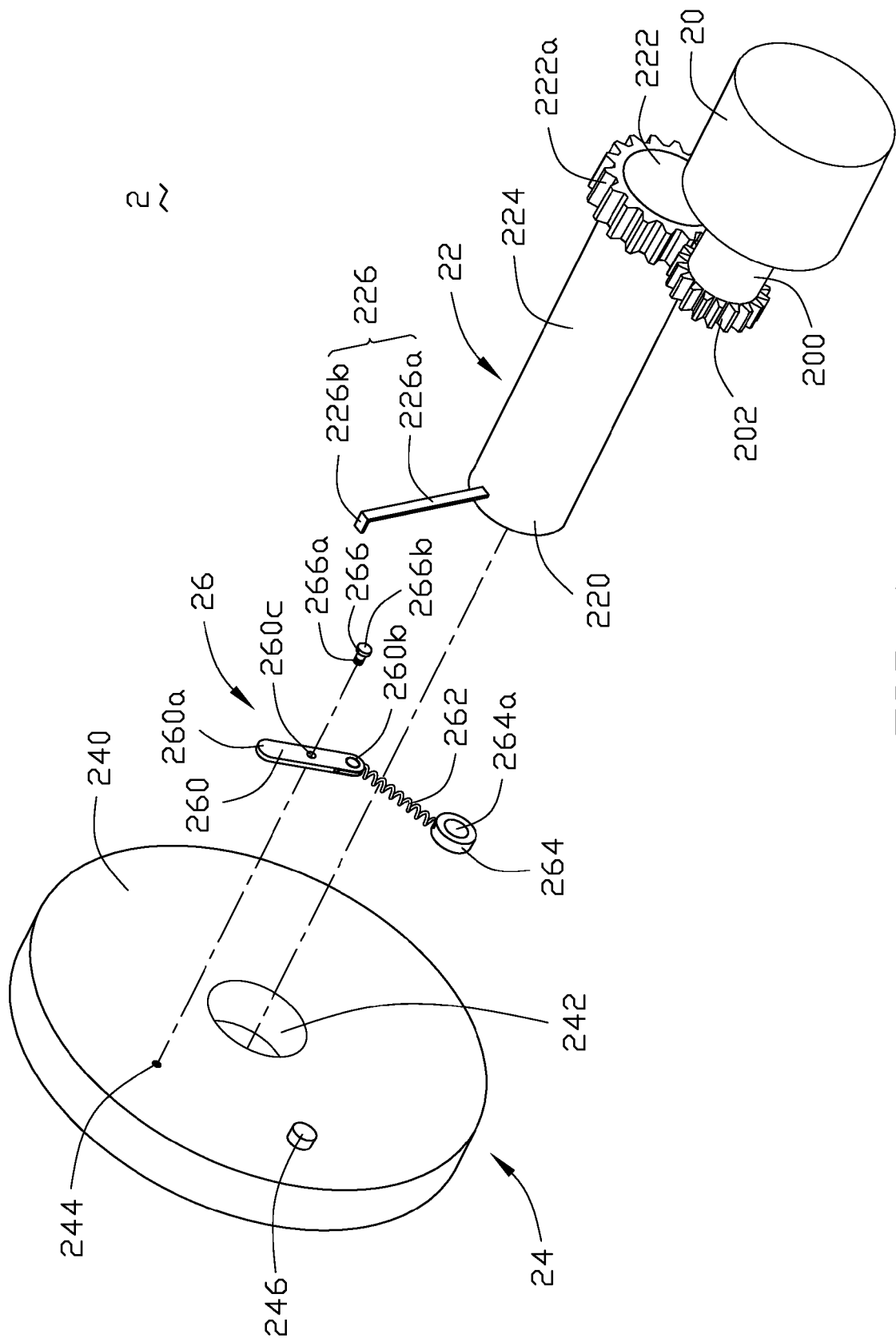
FIG. 1 is an exploded, isometric view of an exemplary embodiment of an overload protection device.

Referring to FIG. 1, an overload protection device 2, according to an exemplary embodiment, is illustrated. The overload protection device 2 includes a transmitting shaft 22 driven by a motor 20, a driving wheel 24, and a transmitting mechanism 26.

The motor 20 includes a rotor 200 and a first gear 202 formed on the distal end of the rotor 200. The motor 20 works normally when supplied with power lower than a rated power. Once the power exceeds the rated power, the motor 20 becomes overloaded.

The transmitting shaft 22 is a cylindrical rod and includes a first connecting end 220, a meshing end 222, a cylindrical surface 224, a driving arm 226 radially extending outwards from the cylindrical surface 224, and a second gear 222a formed on the meshing end 222. The driving arm 226 includes a connecting portion 226a and a forcing portion 226b. The connecting portion 226a is an elongated rectangular plate and substantially extends outwards radially from the cylindrical surface 224 near the first connecting end 220. The forcing portion 226b substantially extends from the distal end of the connecting portion 226a towards the first connecting end 220 of the rotor 22.

The driving wheel 24 is substantially a circular plate and includes an inner sidewall 240 and a fixing member 246. The driving wheel 21 also defines a center hole 242 in the center of the inner sidewall 240 and a connecting hole 244 (e.g., a threaded hole) in the inner sidewall 240 adjacent to the periphery of the inner sidewall 240. The fixing member 246 is a cylindrical protrusion perpendicularly extending outwards from the inner sidewall 240 at a predetermined distance away from the center hole 242 and the connecting hole 244.

The transmitting mechanism 26 includes a rotatable arm 260, a resilient member 262, a connecting ring 264, and a screw 266. The rotatable arm 260 includes a free end 260a and a second connecting end 260b and defines a through hole 260c in the middle. The connecting ring 264 defines an assembly hole 264a in the center. The screw 266 includes a threaded body 266a and a positioning head 266b.

The resilient member 262 deforms (e.g., stretches) when a tensile force applied on the resilient member 262 is larger than a critical tensile force, but remains substantially unchanged when the tensile force is smaller than the critical tensile force. In this embodiment, the resilient member 262 can be a helical spring.

Figure 2:
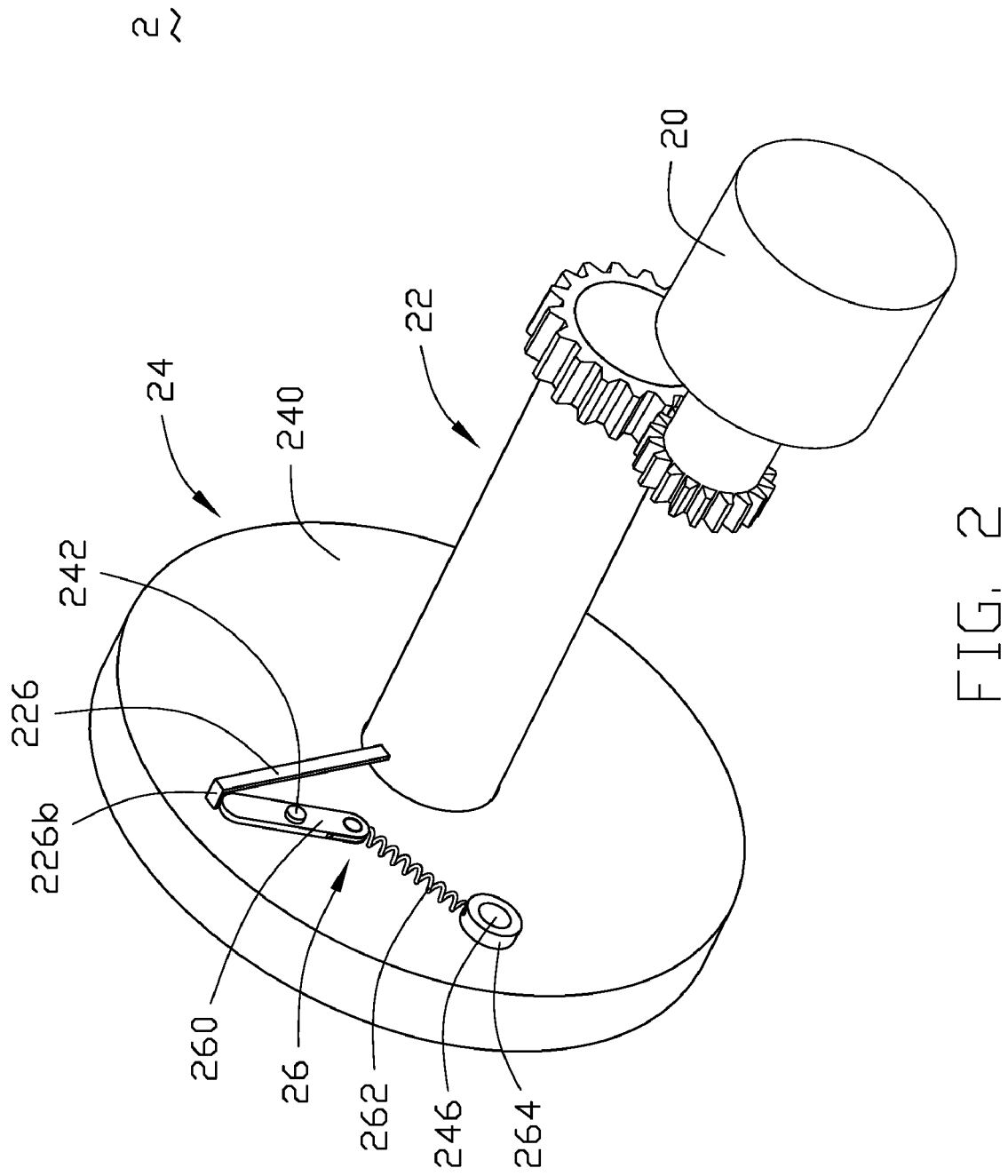
FIG. 2 is an assembled, isometric view of the overload protection device of FIG. 1.

Referring to FIG. 2, in assembly, the transmitting shaft 22 is rotatably connected to the driving wheel 24 via rotatably inserting the first connecting end 220 into the center hole 242. The transmitting shaft 22 is engaged with the motor 20 by meshing the second teethed section 222a with the first gear 202. The rotation arm 26 is rotatably connected to the driving wheel 24 by inserting the threaded end 266a of the screw 266 through the through hole 260c of the rotatable arm 26 and screwing the screw 266 into the connecting hole 244. The connecting ring 264 is fixed on the fixing member 246 of the driving wheel 24. The resilient member 262 is connected between the second connecting end 260b of the rotatable arm 26 and the connecting ring 264.

In use, the motor 10 drives the transmitting shaft 22 to rotate via the first gear 202 and the second teethed section 222a. The driving arm 226 rotates following the transmitting shaft 22 and presses against the free end 260a of the rotatable arm 260 via the forcing portion 226b. The rotatable arm 260 rotates about the screw 266 and applies a tensile force on one distal end of the resilient member 262 if the tensile force is smaller than critical tensile force. The resilient member 262 drives the driving wheel 24 to rotate via the other distal end. Therefore, the torque generated by the motor 20 is transmitted to the driving wheel 24. In this case, the absolute value of the torque outputted by the motor 10 is substantially equal to the absolute value of the torque applied on the driving wheel 24 by the resilient member 262.

If the motor 10 becomes overloaded, the tensile force applied on the resilient member 262 is larger than the critical tensile force. Thus, the resilient member 262 would stretch to a greater degree, the rotatable arm 26 rotates about the screw 266 and, the forcing portion 226b separates from the free end 260a of the rotatable arm 26. As a result, the transmitting shaft 22 would rotate freely, decreasing the load of the motor and protecting the motor 10 from damage caused/due to overloading.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An overload protection device comprising:
   a transmitting shaft driven by a motor comprising a driving arm extending radially outwards from the transmitting shaft;
   a driving wheel rotatably engaged with the transmitting shaft at a distal end of the transmitting shaft apart from the motor;
   a rotatable arm rotatably connected to the driving wheel at the middle portion, and comprising two distal ends; and
   a resilient member connecting one of the distal ends of the rotatable arm with the driving wheel, the driving arm rotates follow the transmitting shaft to press against the other distal end of the rotatable arm apart from the resilient member, the rotatable arm applies a tensile force on the resilient member for driving the driving wheel to rotate; if the motor becomes overloaded, the resilient member stretches to a greater degree, the rotatable arm rotates and the driving arm separates from the rotatable arm, the transmitting shaft rotates freely, decreasing the load of the motor and protecting the motor form damaged due to overloading.

2. The overload protection device as claimed in claim 1, wherein the transmitting shaft comprises a first connecting end, a meshing end, and a cylindrical surface; the transmitting shaft is engaged with the motor via the meshing end.

3. The overload protection device as claimed in claim 2, wherein the driving arm comprises a connecting portion and a forcing portion, the connecting portion substantially extends radially outwards from the cylindrical surface near the first connecting end, and the forcing portion substantially extends from the distal end of the connecting portion towards the first connecting end of the rotor.

4. The overload protection device as claimed in claim 2, wherein the driving wheel comprises an inner sidewall and a fixing member, and defines a center hole in the center of driving wheel and a connecting hole in the inner sidewall adjacent to the periphery of the inner sidewall, the fixing member is a cylindrical protrusion perpendicularly extending outwards from the inner sidewall at a predetermined distance from the center hole and the connecting hole; the transmitting shaft is rotatably connected to the driving wheel by rotatably inserting the first connecting end into the center hole.

5. The overload protection device as claimed in the claim 3, further comprising a connecting ring and a screw, wherein the connecting ring defines an assembly hole in the center, the screw comprises a threaded body and a positioning head.

6. The overload protection device as claimed in the claim 5, wherein the rotatable arm defines a through hole at the middle portion and comprises a second connecting end and a free end, the rotatable arm is rotatably connected to the driving wheel by inserting the threaded end of the screw through the through hole of the rotatable arm and screwing the screw into the connecting hole, the connecting ring is fixed on the fixing member of the driving wheel, the resilient member is connected between the second connecting end of the rotatable arm and the connecting ring, the pressing portion of the driving arm presses against the free end.

7. The overload protection device as claimed in the claim 5, wherein the resilient member deforms when the tensile force applied on the resilient member is larger than a critical tensile force, but remains substantially unchanged when the tensile force is smaller than the critical tensile force.

8. The overload protection device as claimed in the claim 1, wherein the resilient member is a helical spring.

\* \* \* \* \*